(12) United States Patent
Papst

(10) Patent No.: US 6,195,226 B1
(45) Date of Patent: Feb. 27, 2001

(54) DISK STORAGE DEVICE

(75) Inventor: Hans Dieter Papst, Spaichingen (DE)

(73) Assignee: Papst Licensing GmbH & Co., KG (DE)

(*) Notice: Subject to any disclaimer, the term of this patent is extended or adjusted under 35 U.S.C. 154(b) by 0 days.

(21) Appl. No.: 09/053,456

(22) Filed: Apr. 1, 1998

(30) Foreign Application Priority Data

Apr. 1, 1997 (DE) .............................................. 197 13 528

(51) Int. Cl.$^7$ ...................................................... G11B 17/02
(52) U.S. Cl. ............................................................ 360/99.08
(58) Field of Search ............................. 360/99.08, 98.07, 360/99.04

(56) References Cited

U.S. PATENT DOCUMENTS

| Re. 34,412 | 10/1993 | Elsaesser | 360/99.08 |
|---|---|---|---|
| 3,845,339 | 10/1974 | Merkle et al. | 310/156 |
| 4,519,010 | 5/1985 | Elsaesser | 360/97 |
| 5,424,887 | * 6/1995 | Schuh | 360/97.03 |
| 5,446,610 | * 8/1995 | Elsaesser et al. | 360/99.08 |
| 5,774,302 | * 6/1998 | Elsaesser et al. | 360/98.07 |

FOREIGN PATENT DOCUMENTS 42 38 886  5/1994 (DE) .

* cited by examiner

Primary Examiner—George J. Letscher
(74) Attorney, Agent, or Firm—Welsh & Katz, Ltd.

(57) ABSTRACT

The invention relates to a disk storage device having a direct-driving motor for a hub, which has one or two plane air gaps, whereby information storage disks fixed to a hub and located in an operation chamber rotate so as to store data and whereby optical and/or magnetic write/read heads are provided for reading or writing the data on the information carrier disks, whereby the hub of the information carrier disks and the write/read heads are supported together with their driving units on a device chassis or on a device cover plate and whereby the motor driving the hub is a collectorless DC motor having the permanent magnets at the part of the rotor and an ironless disk winding adjacent to the air gap or air gaps, whereby the soft magnetic yoke parts are provided with collar-like stiffening projections (FIG. 1).

14 Claims, 4 Drawing Sheets

DISK STORAGE DEVICE

The present invention relates to a disk storage device according to the characteristic clause of claim 1 and a process for production of such a disk storage device. The invention relates especially to disk storage devices with one or several disk-like information carriers that are fixed or fixable to a rotatable hub and housed in an operation chamber of a device chassis, which is enclosed from the surroundings so as to write or read data by means of optical or magnetic write/read heads that can be moved across the information carriers.

Disk storage devices have an operation chamber with a reduced contamination, where at least one disk rotates. This invention relates especially to hard disk drives with a spotlessly clean operation chamber, as there the silence in operation of the motor is especially sensitive to the function of the device.

Because of the compactness that is required to an extreme extent, driving motors with flat air gaps would be desired for such a type of device. However, a "Pan-Cake-Motor" with a flat air gap and with a given small axial size and a large diameter in a way has a mechanical softness in the axial direction, through which it is very susceptible for vibrations in this region. That particularly disturbes, in combination with magnetic motor forces, the operation of the write/read heads. This is the main reason, why direct drive motors with a flat air gap have not got a chance in hard disk storage devices, yet. The cylindric air gap motor has a natural precedence because of the extreme requirements of compactness, accuracy, silence in operation and noise.

A corrective measure is not given yet, when the magnetic yoke is allowed to co-rotate. This is better, of course, than when the magnetic yoke disk would be stationary. In this case, the axial forces that act between the fixed and the rotating magnetic yoke would also be added. Moreover, a stationary magnetic yoke means eddy current losses (that are considerable, when the number of revolutions is up to 10.000 rpm for hard disk drives), and these eddy current losses cause braking. To suppress these eddy current losses one could use for instance a core of coiled up layers that is configured as a stationary magnetic yoke, but that would be extravagant An alternative to the suppression of the eddy current would be ferritic magnetic yoke portions. A ferritic magnetic yoke means also reduced eddy current losses. By this, on the contrary, the losses due to the hysteresis cannot be avoided, however, they may be relatively low in case of materials that are suitable to ferritic sintered components.

There is a force action between the winding and the rotor, which has an effect on the winding or the winding support (stator side) and the rotating permanent magnet, respectively, the magnetic yoke—but in a reduced manner also in that case, when the latter co-rotates on both sides of the air gap, and these forces go into the bearing in any case. The bearing seat of a disk storage device is disadvantageously loaded against these partly considerable axial forces. A main source of these forces are the pulse-like commutation currents in the winding coils.

Therefore, according to the invention, it is proposed to design the stator /rotor symmetrically in relation to a plane perpendicular to the rotation axis. Then, these forces cancel each other and do not load the bearing.

By further embodying this invention, variants are proposed that are suitable to product engineering, i.e. at a relatively reasonable price, which have, together with a symmetric construction as far as possible in the above mentioned sense, respectively, together with a cheaper asymmetric construction, possibilities to avoid or substantially reduce these pulse-like axial forces, which generally originate from the current pulses in the windings and which are transmitted to the bearing.

For this purpose it is planned to make the magnetic yoke portions stiff against axial deformations in such a manner, that the ocurring, disturbing exciting forces will be damped, also, if it is possible, compensated, respectively, prevented.

The following measures serve for this purpose alternatively or cumulatively:

a) to provide an edge that is bent up in the axial direction into the hub radially at the inner edge of the upper rotating magnetic yoke (steel) plate, so that the upper magnetic yoke of the rotor, if it is formed as a deep-drawn portion with an outer edge directing to the bottom, has preferably an S-shaped cross section between the rotation center and the outer circumferential edge. This would be the rotor portion of the permanent magnet, Oil whose flat ring shaped disk middle part at its bottom the axially magnetized rotor magnet is provided;

b) if the lower flat disk shaped magnetic yoke is allowed to co-rotate, it should be supported on the bent down outer edge of this rotor pot, however the disk shaped winding should be supported radially on the inner edge;

c) on the lower magnetic yoke radially at the inner edge also a bent up collar should be provided;

d) the inner collar at the lower magnetic yoke is bent up into the region of the stator disk winding, perhaps over and above it.

e) If the lower magnetic yoke rotates according d), then it is supported on the inner edge of the collar and the disk winding is mounted on its outer edge.

FIGS. 1–4 show embodiments of this invention.

FIG. 1 shows a construction with an arrangement that is completely symmetric to the heavy broken middle plane M. On both sides of the disk-shaped stator winding permanent magnetic disks rotate together with a soft magnetic yoke.

(In order to balance the disturbing forces completely symmetrically, however, only one arrangement would be suitable, where the broken middle line plane M is in addition substituted by a yoke plate of a soft magnetic type, which runs in this plane and has identical, mirror inverted windings arranged on both of its sides and that must additionally be fed synchronously with the current, as there are, in spite of the otherwise existing symmetry of the construction, different current forces acting on the conductors at the same time in case of for instance a single layer winding with several for instance air-core disk coils, as illustrated here in FIG. 1, as for instance the magnetic field, as shown in FIG. 1, coming from a permanent magnet goes through one of the air gaps, penetrates the disk shaped winding and then goes through the other air gap in the same direction in the other permanent magnet.

In case of the just mentioned complete symmetry, these axially opposing permanent magnets must have oppositely directed magnetic fields somewhere in the plane, and then the magnetic field, coming from the permanent magnets, goes, symmetrically mirrored to the middle plane M, in the there proposed magnetic yoke plate. Such a complete symmetric balancing of a disk motor drive would be desired for a disk storage device, but, obviously, there would be a lot of extravagance.)

Therefore, the illustrated FIG. 1 is already a first economic compromise.

FIG. 2 shows a further simplification, whereby the lower rotating magnetic yoke without a permanent magnet is supported at the upper magnetic yoke, respectively, at its collar, whereas the stator disk is mounted on the inner side.

FIG. 3 shows a mounting device for the disk-shaped stator at the outer edge together with a rotating lower magnetic yoke that has no permanent magnet on it, whereby both of the magnetic yoke disks have bent up collars at their inner circumferential edge that are joined with the hub.

FIG. 4 shows a further step of an economic compromise with a stationary magnetic yoke.

The disk-shaped windings, which are fixed at their inner—or outer edge, may also be integrated in a continous, flat, enclosed printed circuit board that is made preferably of plastics, whereby a certain self-stiffness gives a considerable advantage. This flat stator may also be realized with a printed winding embedded in plastics or, of course, with one or several layer windings together with disk-shaped coils, as already disclosed (DE-PS 25 33 187).

The FIGS. 1–4 show for one of the possible embodiments the construction of the disk storage drive with a hub rotating in a spotlessly clean room, whereby always a stationary shaft is employed in such a so called under-hub-design, i.e. the hub portion that supports the storage disks is arranged anally above the air gap of the driving motor.

Of course, the invention is not confined to this kind of disk storage device, however, it is certainly an advantageous variant. The invention can also be employed for disk storage devices according to DE-PS 29 44 212 or DE-OS 35 19 824.

When such a collar-like bending is provided at the circumferential edge, then the result is a greater silence in operation, as these edges that are bent up to some extent towards the inside of the motor, may cause a symmetric force balancing or relieving of the bearings by stiffening up this element.

When the stator side magnetic yoke is subdivided as coiled up layers or when it is made of ferrite so as to prevent eddy currents and braking, then the heat generating is reduced and/or the above mentioned currents[1]. Because of that, the pure magnetic hysteresis losses cannot be prevented, however, they can be impeded by means of a suitable selection of the material.

[1]Translator: the German version reads Strömungen=currents, but it should read Störungen=disturbations.

If in case of a stationary magnetic yoke one manages to compensate the asymmetric unbalanced forces in the inside of the motor, then one could additionally manage or reduce this asymmetric unbalance by bent up edges or lobes of the stator iron.

However, independently of that, there are the axial exciting forces, which originate from the electromotoric action. Against that the formation of the magnetic yoke iron in the axial direction has to be made stiff, respectively, the magnetic yoke iron has to be provided with additional damping means through layer arrangement, for instance one has to employ a sandwich magnetic yoke sheet. Such additional damping measures combined with maximum axial stiffening are advantageous to several problem cases.

In case of a rotating or stationary magnetic yoke, the high axial stiffness serves also for the magnetic balancing, and at the same time and furthermore, that results in a favorable shielding. Additionally, in case of a disk motor, a labyrinth seal is provided at the lower edge of the bearing system, especially in case of a stationary shaft in the center. This labyrinth seal can be designed very effectively, as there is enough space. Especially the cylindric collar surfaces are effective labyrinth seal elements due to a minimum distance.

A drastic further advantage may be the possibility to increase the axial compactness substantially. For instance the labyrinth seal elements can extend in axial direction into the hub and therefore into the region of the lower ball bearing, where there is a sufficient cross section of the hub material. That complements very advantageously with a bent up collar radially at the inner edge of the rotor pot.

FIG. 1 shows a section of a hard disk storage device, where its upper cover (1) and chassis (2) is outlined. The chassis (2) or frame sits on an encircling edge of a tank flange (3) and in its center a stationary shaft (13) is pressed in a thickening of this tank (3).

At the upper end of this stationary shaft (13) there are two ball bearings (11/12), on which a hub rotates. At the supporting surfaces (9 and 10) of the hub information disks (5) are clamped via adapters by means of a holding shell (6) by screw means. The stator disk that is substantially made of plastics sits together with the integrated winding (22) on the shoulder (23) of the flange shell (3) by means of an inner holding device and extends symmetrically into a space between two permanent magnetic disks (24 and 26) that rotate on both sides of it, so that plane air gaps are formed. These permanent magnetic disks close the magnetic circuit via the magnetic yokes (25 and 27).

The upper magnetic yoke portion[2] (25) is formed as a deep drawn portion in a bell-shaped or cup-shaped manner and has on its lower edge a groove, on which the lower flat magnetic yoke disk (27) is centrally supported. The plane M is magnetically symmetric to the latter and this plane extends, in case of this embodiment, through the center of the stator disk winding (21).

[2]Translator: the German version reads RückschluBkeil, but obviously, this is a spelling mistake and makes no sense; it should read RückschluBteil as it is translated.

In the other figures, the drive element is integrated together with the flange in a disk storage device in the same manner, as shown in Fig. 1. There, nothing but a disk is outlined by a broken line.

In FIG. 2 as well as in the FIGS. 3 and 4 the portions with the same function have got the same numbers.

FIG. 2 shows radially directed reinforcing corrugations 33 that increase the stability of the relatively thinwalled die casting housing shell 3, which forms the tank flange. In FIG. 2 the lower rotating magnet 26 is omitted, so that the deep drawn shell 25 is shortened to some extent at its radial outer edge in the axial direction. Radially at its inner edge, however, an edge is bent up like a collar as far as in the hub 28. This hub and the punched and bent portion 25 are rigidly joined. The lower flat rotating magnetic yoke 27 has no permanent magnet and is supported on the outer edge of the deep drawn shell 25. On both sides of the stator disk there is a plane air gap, analogue to FIG. 1.

FIG. 3 shows an alternative embodiment with a punched and bent portion of a S-shaped cross section. This portion is the upper magnetic yoke, whereas the lower L-shaped soft iron magnetic yoke cap is supported on the inner side of the hub, whereby the collar that is bent up in the axial direction is supported on a flat stopping face. The stator ring disk 31 is with its outer edge supported on a shoulder 39 of the tank flange 3, and extends radially to the inner side and forms on both of its sides also flat air gaps analogue to FIGS. 1 and 2.

FIG. 4 shows a stationary magnetic yoke also with a L-shaped cross section and formed as a turned or punched and bent portion and having a radially at the inner edge located leg that extends in the axial direction so as to form an additional labyrinth seal with the hub portions 35, 38 that rotate around both sides of it. The coils 22 are supported on the lower magnetic yoke plate 27 and are rigidly fixed to it. The plate in turn is supported on the bottom of the tank flange 3, which is thickened in its center and supports a stationary shaft by means of press fit.

What is claimed is:

1. A brushless DC motor in combination with a load member, the combination comprising:

a generally flat stator defining an axis and having a plurality of windings disposed thereon which are concentric with said axis and a rotor mounted for rotation about said axis, said rotor having at least one magnetically conducting member spaced from said windings, said at least one magnetically conducting member having a first planar portions and inner and outer leg portion generally transverse to said planar portion forming inner and outer opposingly oriented axially projecting rim portions and defining a generally cup-shaped configuration, said rotor including a permanent magnetic member disposed on said at least one magnetically conducting member at said planar portion radially off-set of said leg portions, said motor defining at least one radially extending planar air gap between adjacent surfaces of said permanent magnetic member and said stator; and a load member other than a rigid magneto storage disk, said load member being operatively engaged with said rotor by a hub.

2. The brushless DC motor in combination with a load member in accordance with claim 1, wherein said at least one magnetically conducting member is a first magnetically conducting member and wherein said rotor includes a second magnetically conducting member generally parallel to said first magnetically conducting member.

3. The brushless DC motor in combination with a load member in accordance with claim 2 wherein said second magnetically conducting member is spaced from said first magnetically conducting member.

4. The brushless DC motor in combination with a load member in accordance with claim 3 wherein said permanent magnetic member is disposed between said first and second magnetically conducting members.

5. The brushless DC motor in combination with a load member in accordance with claim 3 wherein at least a portion of said stator is disposed between said first and second magnetically conducting members.

6. A brushless DC motor in combination with a load member, the combination comprising:

a generally flat stator defining an axis and having a plurality of windings disposed thereon which are concentric with said axis and a rotor mounted for rotation about said axis, said rotor having at least one magnetically conducting member spaced from said windings, said at least one magnetically conducting member having a first planar portion and inner and outer leg portions generally transverse to said planar portion forming inner and outer opposingly oriented axially projecting rim portions and defining a generally cup-shaped configuration, said rotor including a permanent magnetic member disposed on said at least one magnetically conducting member at said planar portion disposed between said inner and outer leg portions, said motor defining at least one radially extending planar air gap between adjacent surfaces of said permanent magnetic member and said stator; and a load member other than a rigid magnetic storage disk, said load member being operatively engaged with said rotor.

7. The brushless DC motor in combination with a load member in accordance with claim 6, wherein said at least one magnetically conducting member is a first magnetically conducting member and wherein said rotor includes a second magnetically conducting member generally parallel to said first magnetically conducting member.

8. The brushless DC motor in combination with a load member in accordance with claim 7 wherein said second magnetically conducting member is spaced from said first magnetically conducting member.

9. The brushless DC motor in combination with a load member in accordance with claim 8 wherein said permanent magnetic member is disposed between said first and second magnetically conducting members.

10. The brushless DC motor in combination with a load member in accordance with claim 8 wherein at least a portion of said stator is disposed between said first and second magnetically conducting members.

11. A brushless DC motor in combination with a load member, the combination comprising:

a generally flat stator defining an axis and having a plurality of windings disposed thereon which are concentric with said axis and a rotor mounted for rotation about said axis, said rotor having first and second magnetically conducting members spaced from said windings, said first magnetically conducting member having a first planar portion and inner and outer leg portions generally transverse to said planar portion forming inner and outer opposingly oriented axially projecting rim portions and defining a generally cup-shaped configuration, said second magnetically conducting member having a planar portion spaced from said planar portion of said first magnetically conducting member, said rotor including a permanent magnetic member disposed on said first magnetically conducting member at said planar portion between said inner and outer leg portions, said motor defining at least one radially extending planar air gap between adjacent surfaces of said permanent magnetic member and said stator; and a load member other than a rigid magnetic storage disk, said load member being operatively engaged with said rotor.

12. The brushless DC motor in combination with a load member in accordance with claim 11 wherein said second magnetically conducting member planar portion is generally parallel to said first magnetically conducting member planar portion.

13. The brushless DC motor in combination with a load member in accordance with claim 11 wherein said permanent magnetic member is disposed between said first and second magnetically conducting members.

14. The brushless DC motor in combination with a load member in accordance with claim 12 wherein at least a portion of said stator is disposed between said first and second magnetically conducting members.

* * * * *

UNITED STATES PATENT AND TRADEMARK OFFICE
CERTIFICATE OF CORRECTION

PATENT NO.    : 6,195,226 B1
DATED         : February 27, 2001
INVENTOR(S)   : Hans Dieter Papst It is certified that error appears in the above-identified patent and that said Letters Patent is hereby corrected as shown below:

Column 1, line 3 through Column 4, line 58,
Please delete the entirety of text and replace it with the following:

-- Field of the Invention
This present invention pertains to disk storage devices. More particularly, the invention relates to disk storage devices having at least one disk-like information carrier fixed or fixable to a rotatable hub that is driven by a motor having an axial air gap.

Background of the Invention
Disk storage devices generally include an operation chamber or clean room that is enclosed to reduce the contamination therein. Typically, at least one disk rotates within the chamber. Because of the compactness that is desired in such devices, many drive motors have been made quite small. To this end, various motor designs have been used for the drive portion of these devices.

Attempts have been made to use pancake-type motors having a flat air gap and a small axial size with a large motor diameter. However, it has been found that there is "softness" or flexing in the axial direction through which these motors and thus the storage devices are susceptible to vibrations in the motor region. These vibrations, in combination with magnetic forces, have been found to adversely affect the operation of the write/read heads. To this end, disk storage devices generally utilize motors configured having cylindrical air gaps in that these motors meet the demands for compactness, accuracy and silence in operation.

Attempts have been made to manufacture disk storage devices having an axial air gap motor in which the magnetic yoke of the motor is stationary. It has, however, been found that in this configuration, axial forces are induced that act between the fixed and the rotating magnetic yoke. In addition, it has been found that stationary magnetic yoke configurations induce eddy current losses that can be considerable in particular when the disks rotate at speeds of up to 10,000 rpm. To suppress these eddy current losses, attempts have been made to employ a core of coiled layers as a stationary magnetic yoke, however, it has been found that this is prohibitive from both a cost and a design perspective. As an alternative to the suppression of eddy currents, attempts have been made to use ferritic magnetic yoke portions.

UNITED STATES PATENT AND TRADEMARK OFFICE
CERTIFICATE OF CORRECTION

PATENT NO. : 6,195,226 B1
DATED : February 27, 2001
INVENTOR(S) : Hans Dieter Papst It is certified that error appears in the above-identified patent and that said Letters Patent is hereby corrected as shown below:

Column 1, line 3 through Column 4, line 58 (cont'd),

Although this reduces eddy current losses, the losses due to hysteresis are encountered having adverse effects.

Accordingly, there is a need for an axial air gap motor having reduced susceptibility to vibrations and less noise. Desirably, such a motor reduces eddy current losses without extravagance and design and thus increased motor costs.

Summary of the Invention

In accordance with the principles of the present invention, a motor includes a stator/rotor that is symmetrically positioned relative to a plane perpendicular to the axis of rotation of the motor. Such a motor substantially reduces pulse-like axial forces that may otherwise be induced in axial air gap motor configurations. Typically these forces originate from current pulses in the windings that are subsequently transmitted to the motor bearings.

In such a motor, the magnetic yoke portions are stiff or inflexible to axial deformations thus dampening disturbing forces that could otherwise be exerted on the magnetic disks.

In one embodiment, the disk storage includes a housing which encloses a clean room and at least one hard magnetic storage disk provided in the clean room for rotation about an axis. The device includes at least one read/write head mounted in the clean room for movement in operative relation to the at least one disk.

A brushless direct current motor moves the at least one disk in operative relation to the at least one read/write head to allow information to be stored on or retrieved from the disk.

The motor includes a generally flat stator having a plurality of windings disposed thereon which are concentric with the axis. A rotor is mounted for rotation about the axis and is operably connected to the at least one storage disk. The rotor has at least one magnetically conducting member spaced from the windings.

The at least one magnetically conducting member has a first planar portion and a leg portion generally transverse to the planar portion forming an axially projecting rim portion and defining a generally cup-shaped configuration. The rotor includes a permanent magnetic member disposed on the at least one magnetically conducting member at the planar portion, radially inward of the leg portion.

The motor defines a radially extending planar air gap between adjacent surfaces of the permanent magnetic member and the stator.

Figure 1:
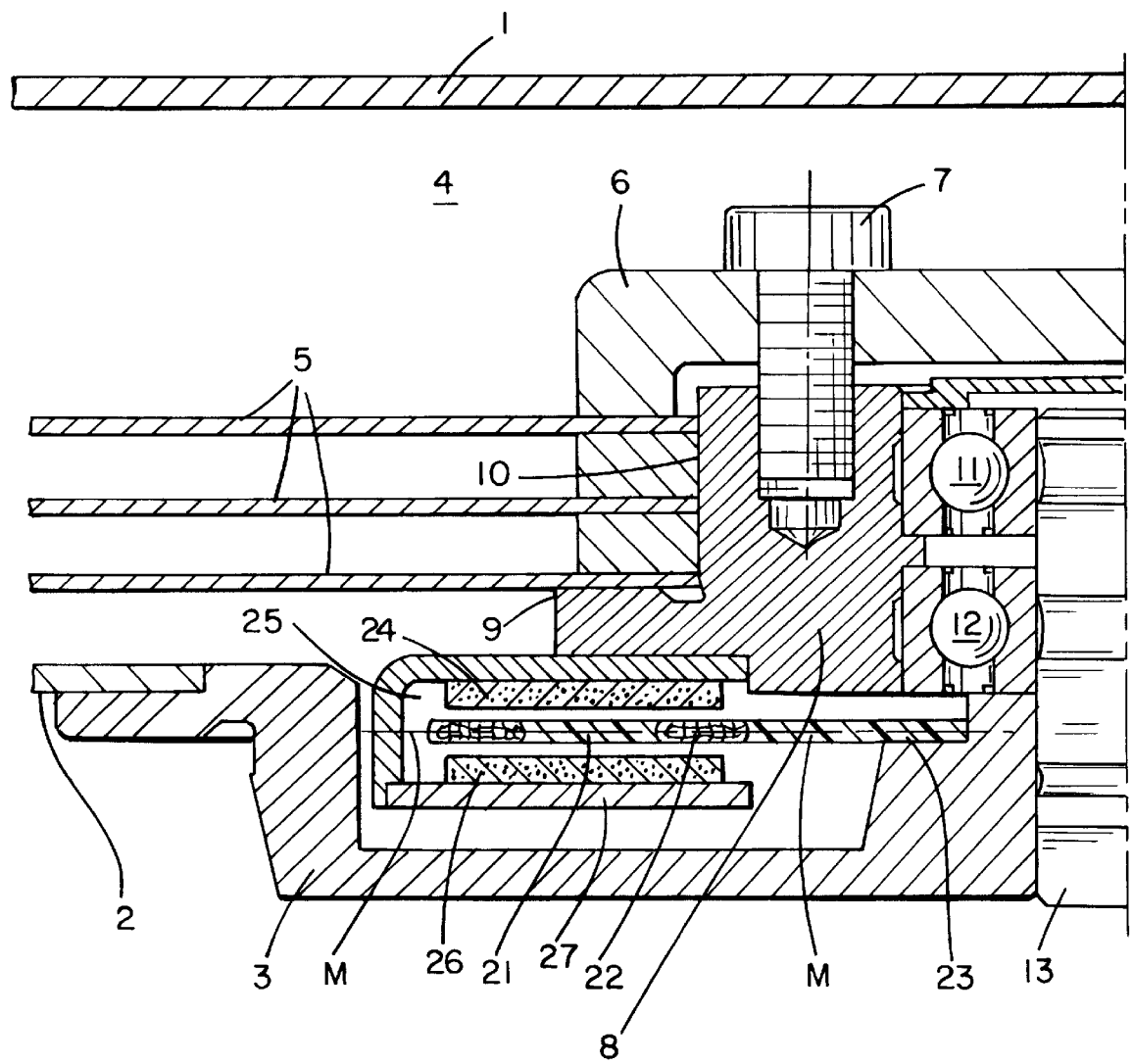
FIG. 1 is a partial cross-sectional view of one embodiment of a disk drive in accordance with the principles of the present invention.

UNITED STATES PATENT AND TRADEMARK OFFICE
CERTIFICATE OF CORRECTION

PATENT NO.    : 6,195,226 B1
DATED         : February 27, 2001
INVENTOR(S)   : Hans Dieter Papst It is certified that error appears in the above-identified patent and that said Letters Patent is hereby corrected as shown below:

Column 1, line 3 through Column 4, line 58 (cont'd),

Detailed Description of the Preferred Embodiments

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring now the figures and in particular to FIG. 1, there is shown a disk storage device embodying the principles of the present invention. The disk storage devices includes an upper cover 1 that covers the device. A chassis or frame 2 provides a lower covering for the device and with the upper cover 1, defines a clean room 4 in which the level of contaminants is maintained at an extremely low level for operation of information disks contained within the clean room 4.

A tank flange or flange shell 3 provides a lower support structure for the disk storage device. Housed within the device, within the clean room 4, is one or more information disks 5, such as hard magnetic storage disks, optical disks, "floppy" magnetic disks, and the like, which information disks will be recognized by those skilled in the art.

The information disks 5 are secured in place by a holding shell 6 secured to the drive by fasteners, such as screws, to a hub 8. The hub 8 provides structural support for maintaining the information disks 5 in position during operation. The information disks 5 are maintained affixed to the hub at a plurality of supporting surfaces 9, 10 by the holding shell 6. The hub 8 and holding shell 6 assembly, along with the information disks 5, rotate about a stationary shaft 13 via one or more bearings (2 shown) 11, 12.

The motor includes a stator disk 21 having a plurality of integrated windings 22 formed thereon. The windings 22 are configured so as to provide a planar, radial air gap, the advantages of which will be recognized by those skilled in the art. In a preferred embodiment, the stator disk 21 is formed of a plastic material. The stator disk 21, in the embodiment shown in FIG. 1, rests on a shoulder 23 of the flange shell 3 so as to extend radially outwardly from the shoulder 23.

Upper and lower magnetically conducting members or magnetic yokes 25, 27, are mounted to the hub 8 and are disposed so as to lie on either side of the stator disk 21. As best seen in FIG. 1, the upper magnetic yoke 25 includes a planar portion extending generally parallel to the stator disk 21 and a leg portion that extends from the planar portion generally transverse thereto. In this manner, the upper yoke 25 is formed as a deep drawn bell-shaped or cup-shaped configuration and defines an axially projecting rim portion. The lower yoke portion is mounted to the upper yoke portion at a groove formed in the axially projecting rim portion.

Permanent magnet disks 24, 26 are mounted on inner surfaces of the upper and lower magnetic yokes, respectively, and thus lie adjacent opposing sides of the stator disk 21 adjacent to the integrated windings 22. In this manner, a radially extending planar air gap is defined between adjacent surfaces of the permanent magnet disks 24, 26 and the stator disk 21. As shown in FIG. 1, a plane M is defined that is magnetically symmetric to the magnetic disks, and which extends through the center of the stator disk 21.

UNITED STATES PATENT AND TRADEMARK OFFICE
CERTIFICATE OF CORRECTION

PATENT NO.     : 6,195,226 B1
DATED          : February 27, 2001
INVENTOR(S)    : Hans Dieter Papst It is certified that error appears in the above-identified patent and that said Letters Patent is hereby corrected as shown below:

Column 1, line 3 through Column 4, line 58 (cont'd),

Advantageously, in the present configuration, which utilizes a rotating, cup-shaped magnetic yoke, high axial stiffness is provided for magnetic balancing. This results in not only stiffness to the yoke and to the overall structure, but also provides favorable shielding characteristics. In addition, this arrangement provides a labyrinth seal at the lower edge of the bearing system, particularly at the stationary shaft. This labyrinth seal in conjunction with the overall structure, greatly reduces the flow of at least some of the magnetic flux from the coils and the permanent magnetic member into the clean room.

Another advantage is that the present arrangement provides structural stiffness in a decreased motor size. For example, the labyrinth seal elements can extend in an axial direction into the hub and thus into the region of the lower bearing. As will be recognized by those skilled in the art, in this region, there is sufficient cross-section of the hub material to accommodate such an arrangement.

Figure 2:
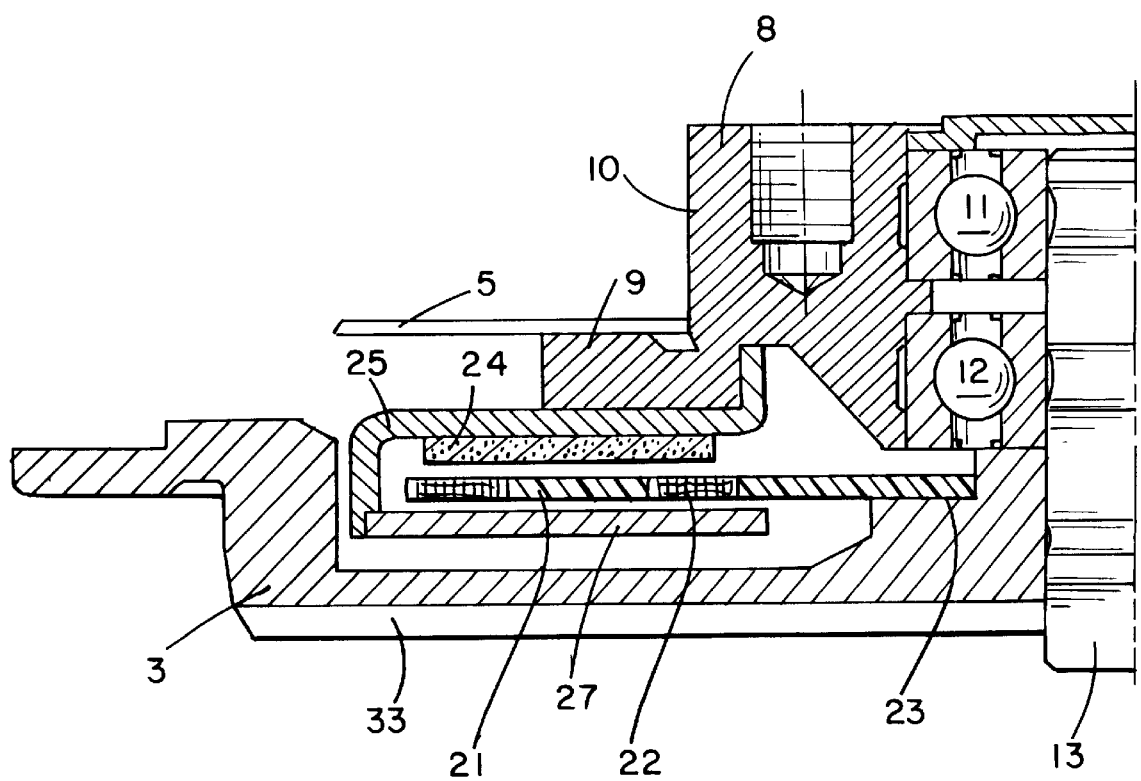
FIG. 2 is a partial cross-sectional view of an alternative embodiment of a disk drive embodying the principles of the present invention.

An alternative configuration is shown in FIG. 2, in which a single, upper permanent magnet disk 24 is affixed to the upper yoke portion 25. In addition, one or more reinforcing corrugations 33 can be formed in the tank flange or flange shell 3 to increase the stability of the shell, which can be formed having a relatively thin-walled configuration. As will be seen from FIG. 2, the leg portion of the upper yoke is somewhat shortened, however, the inner portion of the upper yoke, where the yoke is mounted to the hub 8, can include an upward or bent collar portion to increase the stiffness of the yoke 25. In this manner, the hub 8 and upper yoke portion 25 are rigidly joined to one another. In this configuration, again, planar air gaps are defined between the stator disk 21 and at least the upper permanent magnet disk 24.

Figure 3:
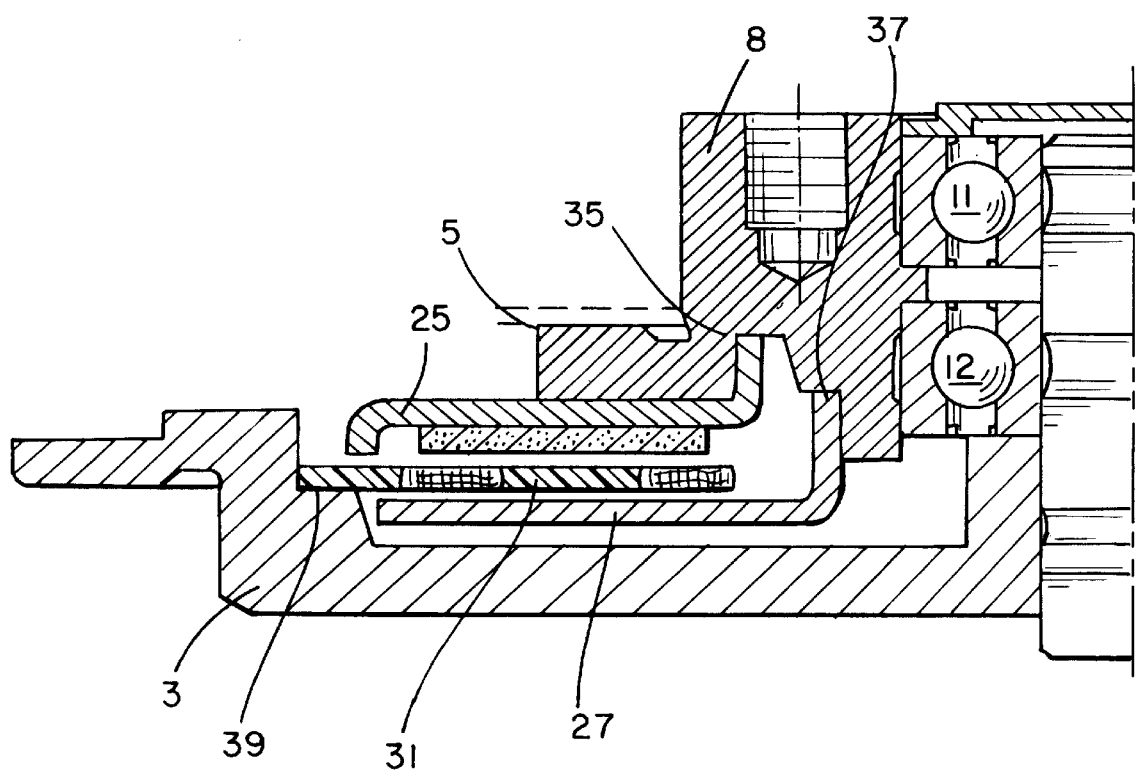
FIG. 3 is a partial cross-sectional view of still another embodiment of a disk drive in accordance with the principles of the present invention.

Still another alternative embodiment is illustrated in FIG. 3. In this embodiment, the upper yoke portion is formed similar to that illustrated in FIG. 2, having an upper bent collar portion for mounting the upper magnetic yoke to the hub. The lower magnetic yoke portion, rather than mounting to the leg portion of the yoke, is also mounted to the hub at an inner portion thereof. The lower yoke includes an upwardly bent leg that mounts to the hub and a planar portion extending generally parallel to the stator disk. In this embodiment, the stator disk is mounted at its outer edge, supported on an outer shoulder 39 of the tank flange 3. Upper and lower planar air gaps are shown between the stator disk and the upper permanent magnet disk.

Figure 4:
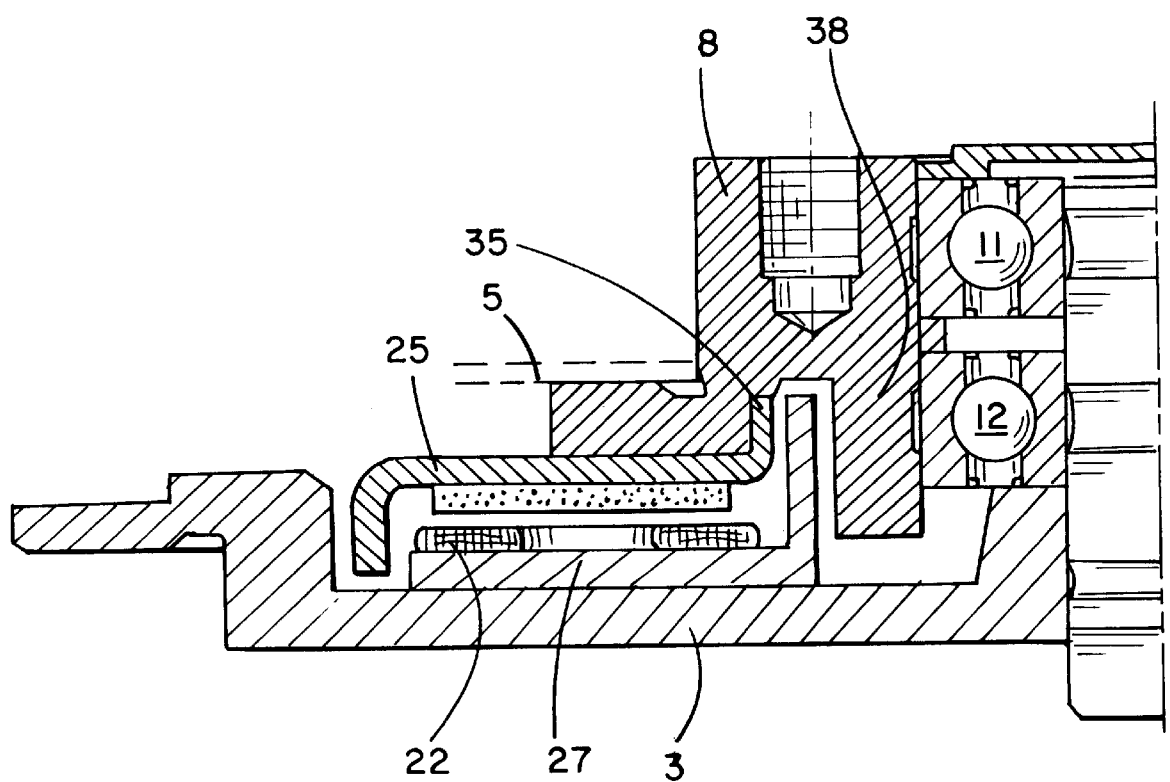
FIG. 4 is a partial cross-sectional view of still another embodiment of a disk drive embodying the principles of the present invention.

Still another alternate embodiment is shown in FIG. 4 (again, in which the upper yoke portion 25 is similar to that shown in FIGs. 2 and 3). In this embodiment, the lower magnetic yoke is fixed to the tank flange 3 and the stator disk is affixed to the lower yoke portion. A planar air gap is defined between the stator disk and the upper permanent magnet disk. This configuration provides an additional labyrinth seal arrangement with the hub portions.

From the foregoing, it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appending claims all such modifications as fall within the scope of the claims. --

UNITED STATES PATENT AND TRADEMARK OFFICE
CERTIFICATE OF CORRECTION

PATENT NO. : 6,195,226 B1
DATED : February 27, 2001
INVENTOR(S) : Hans Dieter Papst It is certified that error appears in the above-identified patent and that said Letters Patent is hereby corrected as shown below:

Column 5,
Line 21, please change "magneto" to -- magnetic --.

Signed and Sealed this

Twenty-eighth Day of June, 2005

JON W. DUDAS
*Director of the United States Patent and Trademark Office*